United States Patent [19]

Arai et al.

[11] Patent Number: 4,639,815
[45] Date of Patent: Jan. 27, 1987

[54] MAGNETIC RECORDING MEDIUM WITH CHROMIUM IRON PROTECTIVE LAYER

[75] Inventors: Yoshihiro Arai; Akira Nahara, both of Kanagawa, Japan

[73] Assignee: Fuji Photo Film Co., Ltd., Kanagawa, Japan

[21] Appl. No.: 604,549

[22] Filed: Apr. 27, 1984

[30] Foreign Application Priority Data

Apr. 28, 1983 [JP] Japan ................... 58-75402

[51] Int. Cl.⁴ ................................. G11B 5/74
[52] U.S. Cl. ................... 360/131; 360/135; 360/134; 428/681
[58] Field of Search ................ 360/131, 134, 135; 427/131, 132; 428/900, 681; 204/41

[56] References Cited

U.S. PATENT DOCUMENTS

| | | | |
|---|---|---|---|
| 3,582,912 | 6/1971 | Valin et al. | 428/681 |
| 4,079,169 | 3/1978 | Nigh et al. | 360/134 X |
| 4,172,171 | 10/1979 | Suzuki et al. | 360/131 |
| 4,409,281 | 10/1983 | Kitamoto et al. | 360/135 X |
| 4,444,849 | 4/1984 | Breuninger et al. | 428/681 |
| 4,476,195 | 10/1984 | Ono et al. | 428/900 |
| 4,496,626 | 1/1985 | Kasuga et al. | 360/135 X |
| 4,496,635 | 1/1985 | Wang et al. | 428/681 |
| 4,521,481 | 6/1985 | Nagao et al. | 360/134 X |
| 4,529,651 | 7/1985 | Kitoo et al. | 360/135 X |
| 4,554,220 | 11/1985 | Yamamoto et al. | 360/135 X |

FOREIGN PATENT DOCUMENTS 0198541 12/1982 Japan ................... 360/131

Primary Examiner—Stuart N. Hecker
Assistant Examiner—Andrew L. Sniezek
Attorney, Agent, or Firm—Sughrue, Mion, Zinn, Macpeak & Seas

[57] ABSTRACT

A magnetic recording medium comprising a non-magnetic support, a thin magnetic metal film on the support, and a protective layer on the thin magnetic film, the protective layer containing chromium and iron, the chromium being present in an amount of 6 to 40 wt % and the iron being the remainder. The protective layer may optionally contain up to 20% by weight nickel.

5 Claims, 4 Drawing Figures

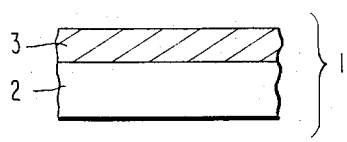
FIG.1
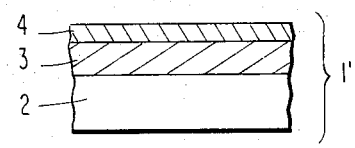
FIG.2
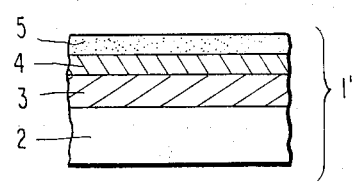
FIG.3
FIG.4
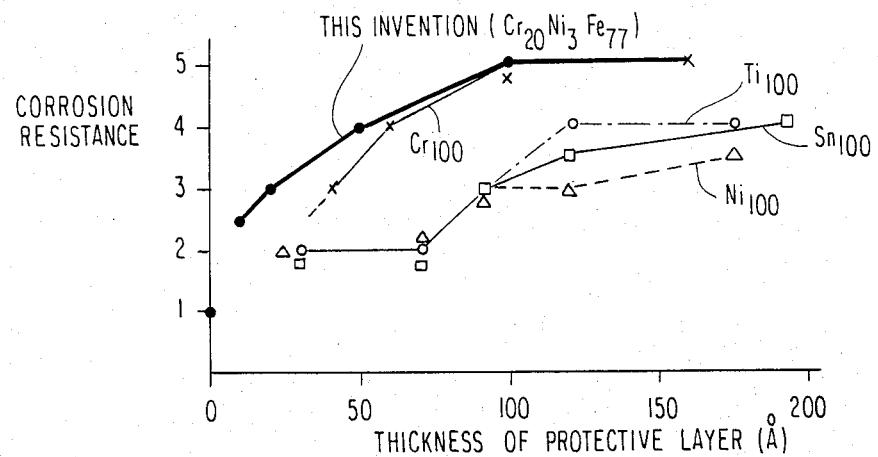
— ●— $Cr_{20}Ni_3Fe_{77}$ (EXAMPLE 1)
—×— $Cr_{100}$ (COMP. EX. 1)
—○— $Ti_{100}$ (COMP. EX. 1)
—□— $Sn_{100}$ (COMP. EX. 1)
—△— $Ni_{100}$ (COMP. EX. 1)

MAGNETIC RECORDING MEDIUM WITH CHROMIUM-IRON PROTECTIVE LAYER

FIELD OF THE INVENTION

The present invention relates to a magnetic recording medium, and more particularly, it relates to a magnetic recording medium of a thin metal film type having markedly improved weather resistance or anti-corrosive properties.

BACKGROUND OF THE INVENTION

Hitherto, a so-called coated type magnetic recording medium has been widely used. The coated type medium has been prepared by dispersing a magnetic powder of oxides such as $\gamma\text{-}Fe_2O_3$, Co-doped $\gamma\text{-}Fe_2O_3$, $F_3O_4$, Co-doped $Fe_3O_4$, Bertholide compounds of $\gamma\text{-}Fe_2O_3$ and $Fe_3O_4$, Co-doped Bertholide compounds or $CrO_2$, or a ferromagnetic alloy powder mainly composed of Fe, Ni or Co in an organic binder such as copolymer of vinyl chloride and vinyl acetate, a copolymer of styrene and butadiene, an epoxy resin or a polyurethane resin to obtain a coating solution, coating the resulting magnetic coating composition on a non-magnetic support and drying to form a magnetic film.

Recently, with the increase in the amount of information to be recorded, practical use of a magnetic recording medium which is suitable for high density recording has been greatly desired. Attention has been drawn to a so-called thin film type magnetic recording medium which is prepared by forming a ferromagnetic thin metal film on the above described support in accordance with methods such as a vacuum deposition method, a sputtering method, an ion plating method or a metal plating method without using the above described binders. Further various attempts have been made through extensive research and development to put the products into practical use.

However, a ferromagnetic thin metal film tends to corrode easily. This is a serious problem which affects reliability as a medium, and the means to solve the problem has not yet been found.

SUMMARY OF THE INVENTION

Accordingly, one object of the present invention is to provide a thin metal film magnetic recording medium having improved weather resistance and anti-corrosive properties.

This and other objects have been achieved by providing a magnetic recording medium comprising a non-magnetic support, a thin magnetic metal film on the support, and a protective layer on the thin magnetic metal film, the protective layer containing chromium and iron, the chromium being present in an amount of 6 to 40 wt % and the iron being the remainder. The protective layer can additionally contain nickel, the nickel being present in an amount of not more than 20 wt %.

BRIEF DESCRIPTION OF THE DRAWINGS

The structure of the magnetic recording medium in accordance with the present invention is illustrated by reference to FIGS. 1 to 3.

FIG. 1 is a schematic view showing the structure of a conventional magnetic recording medium of a thin metal film type, FIGS. 2 and 3 are schematic views showing the structure of the magnetic recording medium of the present invention, and FIG. 4 is results of Comparative Example 1.

In the Figures, a conventional magnetic recording medium of a thin metal film type 1 is composed of a support 2 and a thin magnetic metal film 3 provided on the support, as shown in FIG. 1, whereas a magnetic recording medium 1' in accordance with the present invention has a protective layer 4 which is provided on a thin magnetic metal film 3. A lubricating layer 5 can additionally be provided over the protective layer 4.

DETAILED DESCRIPTION OF THE INVENTION

Suitable non-magnetic supports which can be used in the present invention preferably include a plastic support such as polyethylene terephthalate, polyimide, polyamide, polyvinyl chloride, cellulose triacetate, polycarbonate or polyethylene naphthalate. In addition, a non-magnetic metal such as aluminum, Cu or SUS (stainless) or an inorganic material such as glass or ceramic can be also used as a support.

Most preferred supports include a flexible plastic film having a surface roughness (Ra) of 0.012 μm or less.

A layer containing an inorganic particle (e.g., calcium carbonate, carbon particles) and an organic binder (e.g., nitrocellulose, polyurethane, isocyanate, polyester or a mixture thereof) can be provided on the surface of the support opposite to the ferromagnetic thin metal film.

Magnetic metal materials which can be used as a thin metal film in the present invention include a metal such a Fe, Co or Ni, or a ferromagnetic alloy mainly containing Fe-Co, Fe-Ni, Co-Ni, Fe-Co-Ni, Fe-Rh, Fe-Cu, Co-Cu, Co-Au, Co-Y, Co-La, Co-Pr, Co-Gd, Co-Sm, Co-Pt, Ni-Cu, Mn-Bi, Mn-Sb, Mn-Al, Fe-Cr, Co-Cr, Ni-Cr, Fe-Co-Cr, Ni-Co-Cr, or Fe-Co-Ni-Cr. Of these materials, Co or a Co-containing alloy which includes not less than 75 wt % of cobalt is preferred. In addition, W, Mo, Ta, Mg, Si or Al can be included in small proportions. A non-metal such as C, B, O, N or P can also be included in small proportions. The metals can be included in a basic material which forms a magnetic thin film or can be added to a component for a gas atmosphere which is used for forming a thin film.

The magnetic thin metal film should have a thickness which is sufficient to provide a satisfactory output and sufficient to carry out high density recording. In general, the thin magnetic metal film has a thickness of about 0.02 μm to 2 μm and preferably about 0.05 μm to 1 μm.

The methods of forming a thin magnetic metal film are described, for example, in U.S. Pat. Nos. 2,671,034, 3,329,601, 3,342,632, 3,342,633, 3,156,860, 361,591, etc.

Further, the thin magnetic metal film can be a single layer or multi-layered structure having two or more layers. When the film is composed of multi-layers, a nonmagnetic intermediate layer can be interposed between the layers of the multi-layered structure. An under-coating layer can also be provided between the non-magnetic support and the thin magnetic metal film. A thin magnetic metal film can be provided on opposite both surfaces of the non-magnetic support.

Vapor deposition methods used for forming the thin magnetic metal film and the protective layer in the present invention include not only the general vacuum evaporation method which is disclosed in U.S. Pat. No.

3,342,632 but also the method wherein vapor stream is ionized and vaporization is accelerated in a magnetic field, in an electric field or by electron beam radiation, whereby vaporized molecules can move freely and form a thin film on a support. For example, a method of deposition in an electric field as disclosed in Japanese Patent Publication (Unexamined) No. 149008/76, and a method of deposition by ionization which is disclosed in Japanese Patent Publication (Examined) Nos. 11525/68, 20484/71, 26579/72, 45439/74, Japanese Patent Publication (Unexamined) Nos. 33890/74, 34483/74 and 54235/74, J. Vac. Sci. Tech., 10 (1), p 47 (1973) can be used in the present invention. Additionally, a sputtering method can be used in the present invention as described in U.S. Pat. No. 3,282,815.

The protective layer which is formed on a thin metal film is composed of Cr, Ni and Fe in a mixing ratio of 6 to 40 wt % Cr, 0 to 20 wt % Ni, the remainder being Fe, preferably the mixing ratio of 10 to 40 wt % Cr, 0 to 10 wt % Ni, the remainder being Fe, and has a thickness of 10 Å to 200 Å, preferably 30 Å to 150 Å, more preferably 100 Å to 150 Å. If the thickness is more than 200 Å, electromagnetic properties are poor in that spacing loss is increased. However, the property of weather resistance is continuously improved. Accordingly, a thickness of more than 200 Å is not suitable for practical use. Further, if the amount of Cr is more than 40 wt %, the film tends to scrape and is not suitable for practical use.

A lubricating layer 5 as shown in FIG. 3 can additionally be provided on a magnetic recording medium in the present invention. The lubricating layer must have functions which improve running properties and properties of durability during still mode use. A lubricating layer 5 which is additionally formed on a protective layer 4 preferably includes higher fatty acids, fatty acid esters and combinations thereof. Preferable higher fatty acids include lauric acid, myristic acid, palmitic acid, stearic acid, behenic acid, oleic acid, linolic acid, linolenic acid, arachidonic acid and the like. Suitable fatty acid esters include methyl stearate, ethyl palmitate, monoglyceride stearate and the like.

The lubricating layer 5 can be formed by vapor deposition method such as an ion plating method or by a general coating method.

As hereinbefore described, in the present invention corrosion can greatly be prevented by providing a protective layer having a thickness of 10 Å to 200 Å on a thin magnetic metal film without the accompanying disadvantages which conventional methods generally have had.

For example, conventional magnetic recording media using a thin magnetic metal film have the disadvantage that a hydroxyl group (OH$^-$) can penetrate through an over-coating layer such as a lubricating layer and come into contact directly with a thin magnetic metal film causing the thin magnetic metal film to heavily corrode.

It was found in the present invention that corrosion of a thin magnetic metal film can markedly be prevented by providing a protective layer which is composed of Cr, Ni and Fe in a mixing ratio of 6 to 40 wt % Cr, 0 to 20 wt % Ni, the remainder being Fe. It is believed that the protective layer is firmly and closely overcoated on the thin magnetic metal film and that the thin magnetic metal film itself has excellent weather resistance and anticorrosive properties.

The following examples are given to illustrate the present invention in greater detail.

EXAMPLE 1

An alloy of $Co_{0.8}Ni_{0.2}$ was deposited on a polyethylene terephthalate film (thickness: 23 μm) to form a thin magnetic metal film 3 having a thickness of 1400 Å by the method of oblique vapor deposition having an angle of incidence of 60° under a vacuum condition of $5 \times 10^{-5}$ Torr. Further, a protective layer having a composition of Cr, Ni and Fe in a mixing ratio of 20 wt %, and 3 wt % and 77 wt %, respectively, was formed thereon by a method of vapor deposition which was carried out under a vacuum condition of $3 \times 10^{-5}$ Torr to have a thickness of 45 Å.

The evaluation of weather resistance and corrosion resistance properties was conducted with respect to the thus obtained magnetic recording medium. The evaluation was conducted by observing the degree of demagnetization and corrosion after the magnetic recording medium of the present invention was allowed to stand in a thermostatic room at 60° C. and 90% relative humidity for 2 weeks. As a result of the evaluation, it was found that the magnetic recording medium of the present invention had the degree of demagnetization of 3% and had no corrosion patches.

The relationship between the corrosion resistance (anti-corrosive properties) and the thickness of the protective layer when changed from 10 Å to 200 Å is shown in FIG. 4.

On the other hand, the magnetic recording medium having no protective layer of the present invention, which was evaluated for comparison, had the degree of demagnetization of 15% and a marked amount of corrosion was observed thereon.

EXAMPLE 2

An alloy of $Co_{0.8}Ni_{0.2}$ was deposited by a method of an oblique vapor deposition with an angle of incidence of 45° and under the oxygen atmosphere of $2 \times 10^{-4}$ Torr on a polyethylene terephthalate film (thickness: 23 μm) to form a thin magnetic metal film 3 having a thickness of 1200 Å. A protective layer having a composition of Cr and Fe in a mixing ratio of 20% and 80%, respectively, was thereafter provided thereon under a vacuum condition of $1 \times 10^{-3}$ Torr by introducing argon gas using a sputtering method to have a thickness of 30 Å.

The evaluation of weather resistance and corrosion resistance properties was conducted with respect to the thus obtained magnetic recording medium in the same manner as in Example 1, and as a result, the degree of demagnetization was 5% and corrosion patches were not observed.

COMPARATIVE EXAMPLE 1

The magnetic recording mediums were prepared in the same manner as in Example 1 except that the composition of the protective layer was changed into 100% by weight of Cr, Ti, Sn or Ni alone, respectively, and the thickness of the protective layer was changed into the ranges of 10 Å to 200 Å.

The evaluation of corrosion resistance was conducted with respect to the thus obtained each magnetic recording medium in the same manner as in Example 1. The relationship between the corrosion resistance and the thickness of the protective layer when changed from 10 Å to 200 Å is shown in FIG. 4. In FIG. 4, evaluation "5" of corrosion resistance means that corrosion patches were not observed, and evaluation "1" of corrosion resistance means that corrosion patches were wholly observed. The results of the evaluation of corrosion resistance were further divided into five stages as shown in FIG. 4.

COMPARATIVE EXAMPLE 2

The magnetic recording mediums were prepared in the same manner as in Example 1 except that the composition of the protective layer was changed into the composition shown in Table 1, respectively, and the thickness of the protective layer was changed into 100 Å.

The evaluation of corrosion resistance were conducted with respect to the thus obtained each magnetic recording medium in the same manner as in Example 1. Further, the film-scraping was also observed. The results are shown in Table 1 below.

TABLE 1

| Particular of Evaluation | Composition of Protective Layer | | | |
|---|---|---|---|---|
| | This Invention | Comparison | | |
| | $Fe_{77}Ni_3Cr_{20}$ | $Fe_{97}Ni_3$ | $Fe_{17}Ni_3Cr_{80}$ | $Cr_{100}$ |
| Corrosion Resistance | 5 | 2 | 5 | 5 |
| Scraping | O | O | X | XX |

Note:
"Corrosion Resistance" was evaluated by five stages as in Comparative Example 1. In the scraping observation, "O" means no scraping, "X" means a scraping partially caused, and "XX" means a scraping wholly caused.

From the results shown in Table 1, it can be seen that when Cr content is large, the scraping tends to be caused.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support, a thin magnetic metal film on the support, and a protective layer on the thin magnetic film, to improve corrosion and scraping resistance, said protective layer containing chromium and iron and nickel, the chromium being present in an amount of 6 to 40 wt % nickel in an amount of not more than 20 wt % and iron, being the remainder, wherein the protective layer has a thickness in a range of from 10 Å to 200 Å.

2. A magnetic recording medium as claimed in claim 1 additionally comprising a lubricating layer on the protective layer.

3. A magnetic recording medium as claimed in claim 1, wherein the protective layer the chromium is present in an amount of 10 to 40 wt % chromium, and nickel is present in an amount of 0 to 10 wt %, with iron being the remainder.

4. A magnetic recording medium as claimed in claim 1, wherein the protective layer has a thickness of 30 Å to 150 Å.

5. A magnetic recording medium as claimed in claim 1, wherein the protective layer has a thickness of 100 Å to 150 Å.

* * * * *